United States Patent [19]

Neumann et al.

[11] 3,828,814
[45] Aug. 13, 1974

[54] ELECTRICAL CONTROL ARRANGEMENT FOR GAS OR STEAM TURBINES

[75] Inventors: Klaus Neumann; Wolfgang Fritz, both of Berlin, Germany

[73] Assignee: VEB Bergmann-Borsig/Goerlitzer Maschinenbau, Berlin-Wilhelmsruh, Germany

[22] Filed: Oct. 16, 1972

[21] Appl. No.: 297,990

[30] Foreign Application Priority Data
Sept. 15, 1971 Germany............................ 7115772
Nov. 20, 1971 Germany............................ 7115916

[52] U.S. Cl...................... 137/599, 415/1, 415/17, 415/155
[51] Int. Cl........................ F01d 17/00, F03b 15/06
[58] Field of Search........... 415/17, 155, 1; 137/599

[56] References Cited
UNITED STATES PATENTS
3,741,246   6/1973   Braytenbah.................... 415/17 X Primary Examiner—Arnold Rosenthal
Attorney, Agent, or Firm—Michael S. Striker

[57] ABSTRACT

The basic flow rate for any given output is controlled by main valves driven by a relatively slow electrical drive having a high operating force. Small output changes are rapidly corrected by error valves driven by an electrical system having a very short time constant and a relatively low operating force. Only one error valve is used for correcting flow rate in conjunction with any of the main valves. All valves operate under spring pressure, so that release of a mechanical coupling coupling the valves to the drive system causes a very rapid closing of the valves.

7 Claims, 3 Drawing Figures

3,828,814

ELECTRICAL CONTROL ARRANGEMENT FOR GAS OR STEAM TURBINES

BACKGROUND OF THE INVENTION

This invention relates to electrical control systems for steam or gas turbines.

Known systems for regulating steam or gas turbines utilize several motors to control the valves which in turn control the flow of the operating medium. A fluid under high pressure is used as a source of auxiliary energy.

The same is true for so called electro-hydraulic regulating systems in which the regulating system comprises electrical or electronic building blocks, while the regulating valves are operated hydraulically. Here each individual regulating valve must achieve the required regulating control within its complete operating region. Thus, for a given load point generally a few valves are fully open and thus do not take part in the regulating process. One single valve is partially open and serves to transmit the regulating signals to the operating medium of the turbine. The remaining valves are closed. According to the load applied to the turbine, the control of the flow of operating medium passes from one valve to the next in a predetermined order.

The reason given for the use of hydraulic regulating means is that, first, the valves are subject to very great stresses and further, a very high operating speed is required in order to maintain a sufficiently accurate control. These requirements cannot be met simultaneously with the known electrical drives, so that no possibility was available to use purely electric regulation for steam and gas turbines. Known arrangements therefore require a complicated hydraulic arrangement for supplying fluid under high pressure. In the case of oil, this leads to an additional fire hazard.

A suggestion has been made that the delays in the regulating process resulting from the mechanical inertia in a turbine regulator may be decreased by providing a so-called shock regulator which operator in response to sudden decreases in load by operating an additional throttle valve in the live steam line or to sudden load increases by activating an additional bypass valve.

In this arrangement, the throttle valve controlled by the shock regulator must control the full live steam flow. It is therefore subject to the same physical environment as far as steam power, inertial forces and friction are concerned as is the actual regulating valve for which so far no suitable electrical drive has been found. Thus the problem of furnishing a fast electrical servo motor which also has a sufficient output power and which is always in engagement has not been solved.

Further, the above described system requires a second regulator which responds only to load changes having a predetermined minimum magnitude. Thus the system is not suitable for regulating small changes rapidly.

SUMMARY OF THE INVENTION

It is an object of the present invention to furnish an electrical control system for steam or gas turbines which has the required high operating speed and wherein the regulating valves are electrically controlled only.

The system of the present invention is operated in a turbine having an operating medium and furnishing at least one desired output. It comprises an electrical regulating system for changing the flow rate of the operating medium to maintain that desired output. At least one basic flow control means are furnished for regulating that flow of said operating medium to base flow rate corresponding to said desired output. First electrical drive means are furnished for driving said basic flow rate control means, said first electrical drive means having a first time constant and a first operating force. Further provided are error flow control means for changing that flow rate of that operating medium to maintain said desired output, said changes of that operating medium being within a predetermined flow range around said base rate. Second electrical drive means are provided for driving said error flow rate control means, said second electrical drive means having a second time constant substantially less than said first time constant and a second operating force substantially less than said first operating force. Finally, mechanical closing means are provided which are coupled to said basic and error flow rate control means, for rapidly closing said flow control means upon decoupling from said first and second electrical drive means respectively.

While in previously known systems each valve had to transmit all regulating signals to the steam flow within its particular control region, in the present invention the regulation of small deviations of the output from the desired output is controlled via a particular valve selected for this purpose. This valve, herein referred to as error flow control means, operates in conjunction with any of the main valves to compensate for such small deviations. Since it is required to compensate for only very small output changes, the total quantity of steam or gas controlled by this error flow control valve is very small. It is thus the function of the error flow control valve to control a small quantity of steam, but at a high speed.

Since only relatively little power is required for operating such a valve, the required high regulating speeds may be achieved with an electrical drive, for example an electromechanical drive (drive motor) or an electromagnetic drive, such as a control coil, while still maintaining the required degree of regulation.

The basic flow rate corresponding to each desired output is, as previously, furnished by the valves having rather large dimensions. However these must now only be operated at a relatively low speed and therefore may be driven by a purely electrical drive having a high operating force.

The relatively low regulating speed for the larger basid flow control valves means do not cause errors in the system, since they are still within the speed required for load changes of the turbine, so that the normal loading and unloading processes during the operation of the turbine are accomplished as previously.

In the system according to the present invention, the rate of flow for the required desired output is determined by sum of the flows of the basic flow control valves and a desired flow rate through the error valve. The desired flow rate through the error valve is chosen to be one-half the maximum flow rate which may be maintained through said valve, if the requirements of a particular system do not indicate the need for another desired flow rate through said error valve.

The control signals supplied to the error valve are supplied by the regulating system of the two separate channels. The first channel carries only slowly changing signals and transmits the signal for controlling the position of the basic flow control valve or valves. A follow-up control relative to the position of the basic flow control valves serves to effect the desired half-way opening of the error valve for any particular turbine load over the whole operating range.

The second channel transmits only rapidly changing control signals caused by outside disturbances and thus controls the instantaneous regulation of the operating medium via the error valve on both sides of the center value, within the operating range of the error valve.

In a preferred embodiment of the present invention regulating means are provided which furnish a regulating signal including a base signal corresponding to the desired output and an error signal corresponding to deviations of said output from said desired output. The output of the regulating means is connected to the input of both the first and the second electrical drive means. However, delay means are interconnected between the regulating means and the first electrical drive means so that an average signal rather than an instantaneous signal is applied to the input of said first electrical drive means. In order that the error valves will be responsive only to the error signal, the output of said delay means is subtracted from the output supplied by the regulating means prior to the time that the regulating signal is applied to the second electrical drive means. In this manner the error valve responds merely to rapid small disturbances in the turbine output and returns to its normal position when such small and rapid changes have subsided.

In the event that changes in turbine output may occur which exceed the range of the error valve, threshold means are provided which, in the presence of such an error signal, apply said error signal directly to the input of the first electrical drive means for control of the basic flow control valve. In this event, the output of the threshold means is added to the output of the delay means and the sum signal is applied to the input of the first electrical drive means. Thus, the full regulating signal is applied to the input of the first electrical drive means without any delay.

As mentioned above, it has been found desirable tht the error valve has a half-open position in response to a zero error signal. The steam passing through the error valve thus is somewhat throttled which causes a power loss. Further, the regulating range of such a half-open valve is of course only half the maximum flow rate permissible through said valve.

In order to avoid the above-mentioned power loss and in order to allow the range of error signals controllable by the error valve to be doubled, in a preferred embodiment of the present invention the single error valve is replaced by two error valves each of which is connected with one of two special groups of nozzles of the turbine inlet. The error valves operate in common with one or more flow control valves. In case of using two or more flow control valves, these open or close slowly one after another according to the desired flow. One of the error valves is closed under quiescent conditions, while the other one is fully open. In response to error signals requiring an increase of operating medium flow, the closed valve is opened, while in response to an error signal of opposite polarity, the open valve is activated towards its closed condition. That error valve whose operation is not required is of course kept in its normal position, either open or closed as the case may be.

It will be noted that the error signal which is appropriate for the use of one error valve may also be used for controlling the two error valves mentioned above.

The same threshold means may also be used.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESECRIPTION OF THE PREFERRED EMBODIMENTS

Figure 1:
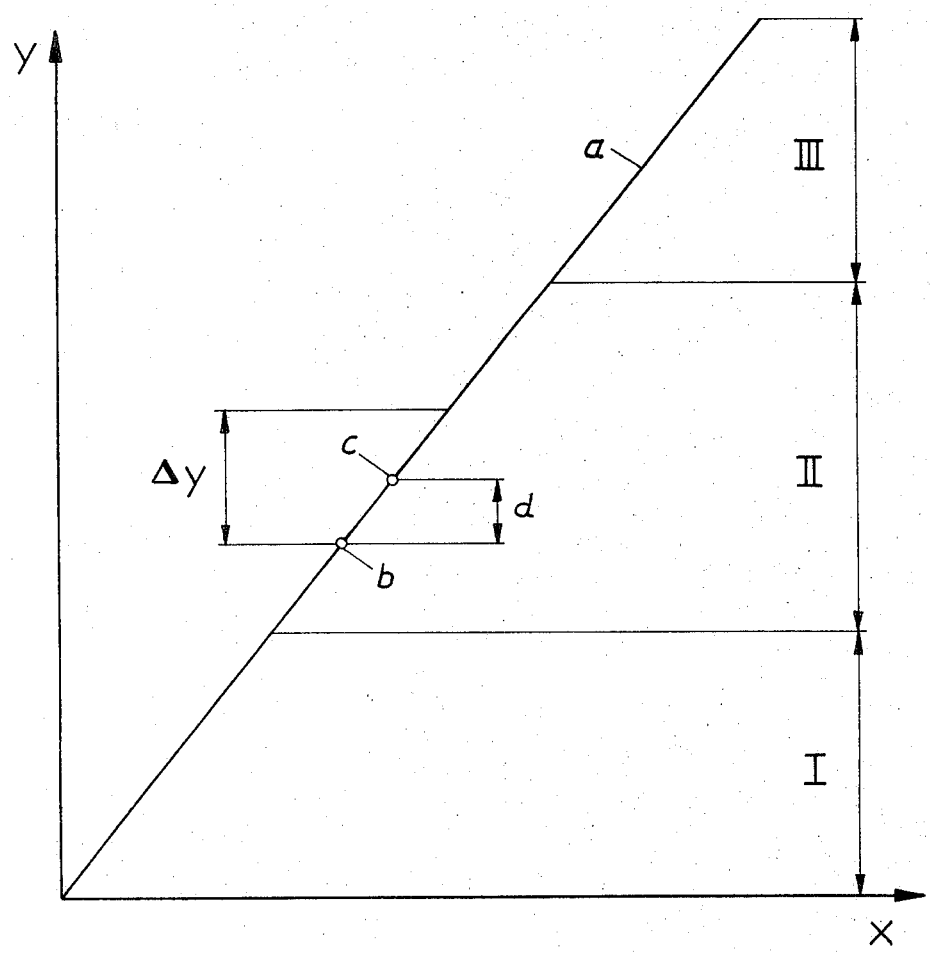
FIG. 1 shows a characteristic curve of the turbine having a plurality of basic flow rate control means.

A preferred embodiment of the present invention will be described with reference to the drawing.

FIG. 1 shows a part of the basic control valve positions, or of the power or flow rate of the machine along the ordinate, while the regulating signals are plotted along the abscissa. On line a of the diagram point b denotes a particular desired value for the opening of valve II. This valve is of course a basic flow control valve as are valves I and III. The value at point b corresponds to the closed position of the error valve. The error valve is to regulate deviations from the output up to a range of $\Delta 4$. $\Delta y$ represents the maximum flow allowable through the error valve. Point $c$ on line a represents the desired value which is to be achieved by the correct adjustment of the value d which represents the maximum flow permissible through the error valve.

Figure 2:
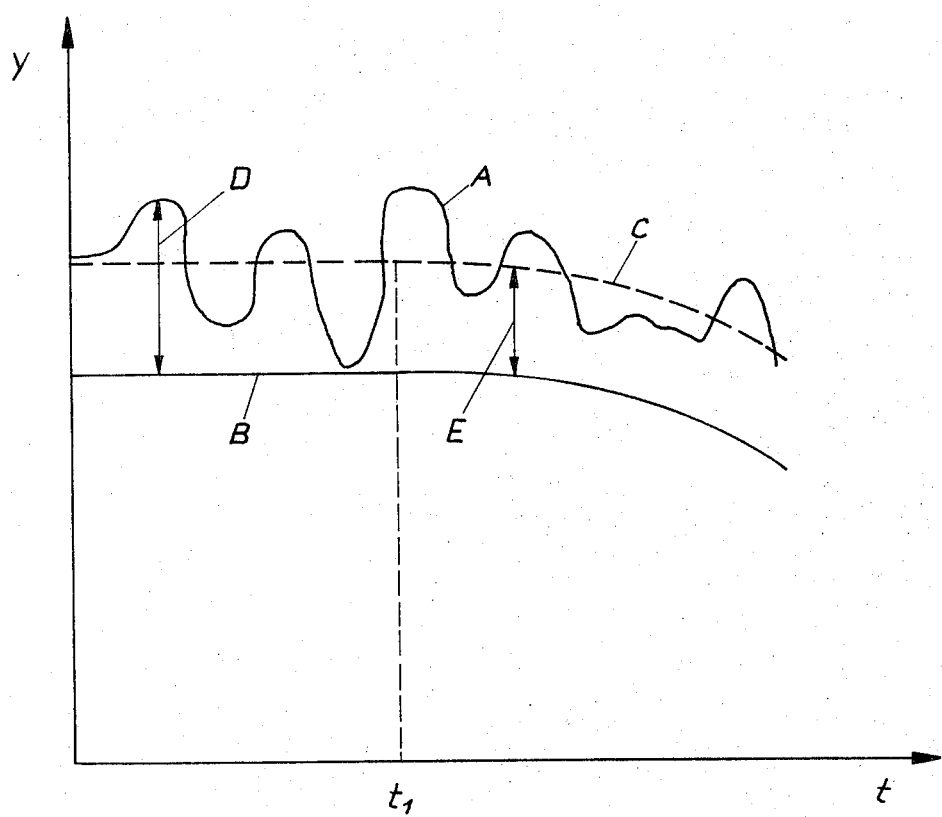
FIG. 2 shows characteristic curves illustrating the regulating process in a turbine.

In FIG. 2 the abscissa $x$ is the time axis, while the variations in the openings of the valves are plotted along the ordinate $y$.

Curve A shows the movement of the regulating valve in a conventional regulating arrangement.

Curve B shows the movement of the basic control valve in a regulating system according to the present invention.

Curve C shows the desired value furnished by the error valve.

The distance marked D indicates the instantaneous position of the error valve.

Let is now be assumed that at a time $t_1$ it is desired to decrease slowly the output of the turbine. Thus the flow through the basic control valve is slowly decreased (curve B). The flow through the error valve remains unchanged (Distance E). Instantaneous deviations are corrected by said error valve by superimposing its flow upon the flow of the basic control valve (distance D).

The maximum operating speed of the valve is required upon disconnecting of full load. The following arrangement is furnished to provide safe operation under these conditions. First, the valve rods of both the basic flow control valve and the error valve are coupled to the respective electrical drives by means of a mechanical coupling which may be electromagnetically or electrically released. Upon such a release, springs are provided which force the valves into the closed position at a very rapid speed. The electrical drive then follows the valve and, following automatic recoupling of the valve to the electrical drive means, puts the valve into the position which is required after the load has been removed.

Thus, a full-load release monitoring system and a system for monitoring the supply voltage to the first and second electrical drives are also provided in order to furnish a signal to the couplings described above under the conditions of a full-load release or when there is no power furnished to the electrical drives.

Figure 3:
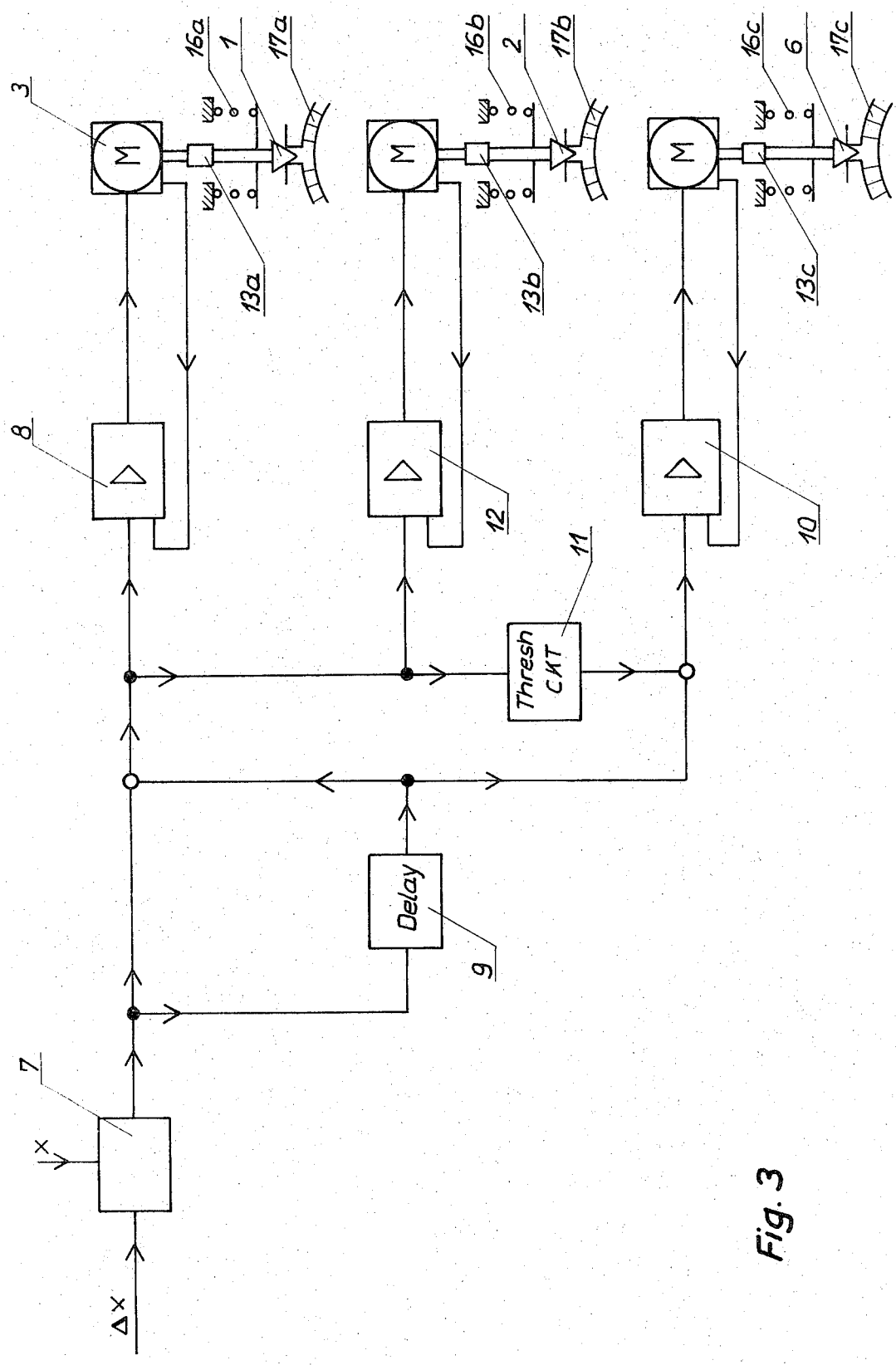
FIG. 3 is a block diagram showing a control system according to the present invention.

A preferred embodiment of the present invention is shown in FIG. 3. In this embodiment it is desired to maintain the speed of a stream turbine constant. Provided at reference numeral I is an error valve 1 (herein referred to as the opening or first error valve), connected with a group of nozzles 17a and an error valve 2 (herein referred to as the closing or second error valve) connected with an other group of nozzles 17b. In the stable state, for $\Delta x = 0$, the servo motor 3 would maintain the error valve 1 in the closed position, while servo motor 4 would maintain error valve 2 fully open. Further shown in FIG. 3 is a basic control valve 6 which is maintained in the position for maintaining the desired output by means of a servo motor 5 connected with a group of nozzles 17c. Further shown in FIG. 3 are control amplifiers 8, 10 and 12 respectively associated with servo motors 1, 4 and 5. At the input of each of these control amplifiers the actual motor position is compared with the desired motor position as furnished to a second input of the control amplifier. The output of the control amplifier then drives the motor in such a manner that it assumes the desired position as required by the regulating signal.

In the event of a disturbance wherein, for example, $\Delta x < 0$, regulating means 7 which in this particular case may for example be a speed regulator, furnishes a regulating signal which is applied to control amplifier 8 and immediately activates servo motor 3 to effect a rapid control of opening valve 1. The signal furnished by regulating means 7 further, delayed by the delay or averaging means 9, effects the movement of motor 5 via control amplifier 10. Thus, valve 6 begins to move, although substantially more slowly as does error valve 1. The signal furnished at the output of delay means 9 further serves to influence the input to amplifier 8 by being combined with the previously applied signal to the second input of amplifier 8 at the subtraction stage labelled 14. If the change or error is larger than that which may be regulated by valve 1, the threshold means 11 pass a signal which is immediately applied to the input of power amplifier 10, thereby causing valve 6 to operate in response to the error signal without delaying said error signal.

If of course the change $\Delta x > 0$, the system functions as set forth above, except that the error valve which is being operated is valve 2 rather than valve 1. Thus, amplifier 12 and motor 4 would be operative rather than amplifier 8 and motor 3. The $\Delta x$ herein referred to may of course be a speed change, a negative $\Delta x$ corresponding to an undesired decrease in speed, while a positive $\Delta x$ corresponds to an undesired speed increase.

Further shown in FIG. 3 are couplings 13a, 13b and 13c respectively coupling motors 3, 4 and 5 to valves 1, 2 and 6. Further shown are corresponding springs 16a, 16b, 16c which serve to close valves 1, 2 and 6, respectively, and rapidly upon decoupling of couplings 13a, 13b, 13c. As mentioned above, this decoupling may take place when the full load is suddenly thrown off the system or in the event that no power is available for driving the valves. In the event of a full-load disconnect, the regulating system follows the movement of the valves and is automatically re-coupled thereto, thereby resuming control of the movement of said valves.

If of course one error valve is to be used, the circuit shown in FIG. 3 must be suitably modified. Error valve 2, its associated motor 4 and amplifier 12 would not be required. The embodiment shown in FIG. 3 has the advantage that standard, commercially available building blocks readily be used.

While the invention has been illustrated and described as embodied in a delay means and threshold means, it is not to be limited thereto since other systems utilizing different electrical circuits for furnishing the static and the dynamic regulating signals can readily be devised without departing from the spirit and concept of the present invention.

Without further analysis, the foregoing will so fully reveal the gist of the present invention that other can by applying current knowledge readily adapt it for various applications without omitting features that, from the standpoint of prior art, fairly constitute essential characteristics of the invention and, therefore, such adaptations and modifications should and are intended to be comprehended within the meaning and range of equivalence of the following claims.

What is claimed as new and desired to be secured by Letters Patent is set forth in the appended claims:

1. In a turbine having an operating medium and furnishing an output, a system for changing the rate of flow of said operating medium to compensate for changes in said output from a desired output, comprising, in combination, at least one basic flow control means for regulating said flow of said operating medium to a base flow rate corresponding to said desired output, said basic flow control means having a predetermined maximum flow rate capacity; first electrical drive means for driving said basic flow control means, said first electrical drive means having a determined maximum operating speed and a determined maximum operating force; error flow control means responsive to said changes in said output for furnishing, within predetermined flow rate limits, changes in said flow rate around said base flow rate to compensate for said changes in said output, said error flow rate control means having a determined maximum flow rate capacity substantially less than said determined maximum flow rate capacity of said basic flow control means; second electrical drive means for driving said error flow control means, said second electrical drive means having a determined operating speed substantially higher than said determined operating speed of said basic flow control means and a determined maximum operating force substantially less than said determined maximum operating force of said basic flow control means; and coupling means for coupling said basic and said error flow control means to said first and second electrical drive means respectively, whereby said first flow control means and said first electrical drive means constitute a relatively low speed high capacity system for regulating the base flow rate while said error flow control means and said second electrical drive means together constitute a relatively low capacity high speed system for compensating for said changes in said output from a desired output.

2. A system as set forth in claim 1, wherein said basic flow control means comprise at least first and second basic flow control valve means furnishing, respectively, a first and second base flow rate corresponding to a first and second desired output; and wherein said error flow control means comprise common error valve means operative with said first basic flow control valve means when said turbine is furnishing said first desired output and with said second basic flow control valve means when said turbine is furnishing said second desired output.

3. A system as set forth in claim 1, further comprising regulating signal furnishing means for furnishing an electrical regulating signal, including an error signal corresponding to said changes of said output from said desired output; means connecting said regulating signal furnishing means to said first and second electrical drive means; and delay means interconnected between said regulating signal furnishing means and said first electrical drive means.

4. A system as set forth in claim 3, further comprising threshold circuit means interconnected between said regulating signal furnishing means and said first drive means for bypassing said delay means and furnishing said regulating signal directly to said first drive means when said error signal exceeds a predetermined error signal.

5. A system as set forth in claim 3, further comprising threshold circuit means interconnected between said regulating signal furnishing means and said first electrical drive means for bypassing said delay means and furnishing said regulating signal directly to said first drive means when said error signal exceeds a predetermined error signal corresponding to said determined maximum flow rate capacity of said error flow control means.

6. A system as set forth in claim 1, wherein said coupling means comprise mechanical coupling means adapted to decouple in response to a decoupling signal; further comprising spring means coupled to said basic and said error flow control means, for rapidly closing said basic and error flow control means upon decoupling of said coupling means.

7. A system as set forth in claim 2 wherein said common error valve means comprise a first error valve for increasing said flow of said operating medium and a second error valve for decreasing said flow of said operating medium, each of said two error valves being connected with one of two special groups of nozzles of the turbine inlet said first and second error valves having, respectively a fully closed and fully open position when said output is said desired output.

* * * * *